(12) United States Patent
Jaming

(10) Patent No.: US 10,219,197 B2
(45) Date of Patent: Feb. 26, 2019

(54) MOBILE INTERCONNECTION DEVICE

(71) Applicant: DYRUN, Dommartemont (FR)

(72) Inventor: Christophe Jaming, Villers-les-Nancy (FR)

(73) Assignee: DYRUN, Dommartemont (FR)

( * ) Notice: Subject to any disclaimer, the term of this patent is extended or adjusted under 35 U.S.C. 154(b) by 10 days.

(21) Appl. No.: 15/119,496

(22) PCT Filed: Feb. 17, 2014

(86) PCT No.: PCT/FR2014/050325
§ 371 (c)(1),
(2) Date: Aug. 17, 2016

(87) PCT Pub. No.: WO2015/121544
PCT Pub. Date: Aug. 20, 2015

(65) Prior Publication Data
US 2017/0013531 A1    Jan. 12, 2017

(51) Int. Cl.
*H04W 36/30* (2009.01)
*H04W 88/10* (2009.01)
*H04W 76/15* (2018.01)
*H04W 92/10* (2009.01)

(52) U.S. Cl.
CPC .......... *H04W 36/30* (2013.01); *H04W 76/15* (2018.02); *H04W 88/10* (2013.01); *H04W 92/10* (2013.01)

(58) Field of Classification Search
CPC ... H04W 36/30; H04W 76/025; H04W 88/10; H04W 92/10
See application file for complete search history.

(56) References Cited

U.S. PATENT DOCUMENTS

| | | | |
|---|---|---|---|
| 8,537,715 B1 | 9/2013 | Vadivelu | |
| 2003/0092462 A1* | 5/2003 | Dartois | H03G 3/3047 455/522 |
| 2006/0114883 A1* | 6/2006 | Mehta | H04W 80/04 370/352 |
| 2007/0030857 A1 | 2/2007 | Fulknier et al. | |
| 2010/0020753 A1 | 1/2010 | Fulknier et al. | |
| 2011/0019651 A1* | 1/2011 | Fulknier | H04L 45/00 370/338 |
| 2012/0263159 A1 | 10/2012 | Moeller et al. | |

FOREIGN PATENT DOCUMENTS

| | | |
|---|---|---|
| EP | 2 393 323 | 12/2011 |
| JP | 2005-311580 | 11/2005 |

* cited by examiner

*Primary Examiner* — Erica Navar
(74) *Attorney, Agent, or Firm* — Occhiuti & Rohlicek LLP

(57) ABSTRACT

An interconnection device includes a wide area network interface, arranged for establishing a connection with a base station in a plurality of wide area networks of the cellular network type. There is a local area network interface, arranged for communication between a local device and the wide area network interface.

18 Claims, 1 Drawing Sheet

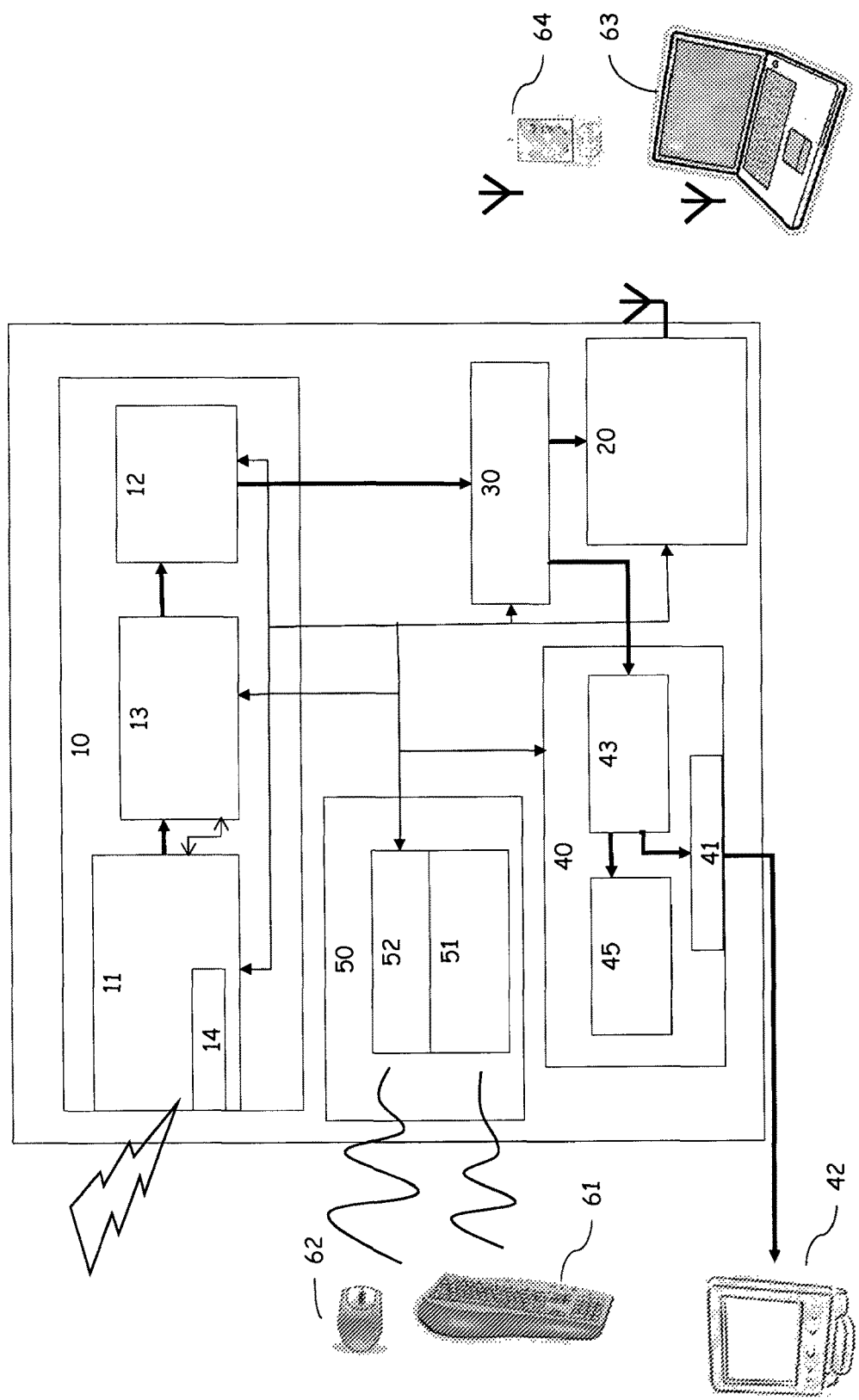

MOBILE INTERCONNECTION DEVICE

RELATED APPLICATIONS

This is the national stage, under 35 USC 371, of PCT application PCT/FR2014/050325, filed on Feb. 17, 2014, the content of which is herein incorporated by reference.

FIELD OF INVENTION

The invention concerns an external, autonomous, mobile interconnection device, for the connection to a mobile communication network (wide area network) of a terminal such as a PC, touch tablet, smartphone, telephone, display screen, video projector, etc.

BACKGROUND

Mobile interconnection devices are already known, e.g. a 3G dongle, enabling a user to connect a terminal such as a PC or a tablet to a cellular network for mobile Internet access. Such a device only allows the connection of a single terminal. In addition, such devices allow the connection to a single cellular network, and therefore evidently cannot be used to establish a connection in an area not covered by said network; this is disadvantageous for the user, notably in rural areas where the coverage is often limited to a single rather weak network.

Furthermore, such devices have quite low data rates, limited to the rate available locally, in the proximity of the devices, on the wide area network to which they are connected, and accordingly provide a fairly unsatisfactory service.

Also, these devices cannot be used to simply connect display terminals that do not have internal wireless transmission/reception means.

SUMMARY OF INVENTION

The invention provides a new interconnection device, enabling all or part of the drawbacks of known interconnection devices to be remedied.

More precisely, the invention concerns an interconnection device, including:
  a wide area network interface, arranged for establishing a connection with a base station in a plurality of wide area networks of the cellular network type,
  a local area network interface, arranged for communication between a local device and the wide area network interface.

With a wide area network interface arranged for establishing a connection with a base station in a plurality of wide area networks, the device according to the invention can be used for having maximum coverage, and therefore the widest possible service geographically.

The local area network is preferably a wireless network, e.g. of the Wi-Fi type.

Preferably, the local area network interface is arranged for sharing a signal received from the wide area network interface between multiple local devices. Thus, it is possible to connect multiple local devices, e.g. a PC, tablet, telephone, etc. simultaneously to a wide area network.

In the interconnection device according to the invention the wide area network interface may include:
  a broadband receiver arranged for continuously receiving a plurality of communication signals from a plurality of base stations associated with the plurality of wide area networks having transmission frequencies between 500 and 3000 MHz, and
  a selection device arranged for selecting a more powerful signal from the plurality of signals received, and transmitting the selected signal.

A broadband receiver enables the device according to the invention to receive all the signals from all the wide area networks. The selection device then chooses the network, and more precisely the base station of said network, providing the most powerful signal. This ensures the best possible reception at a given instant and in a given geographical location of the device according to the invention, if the geographical area is covered by at least one wide area network.

Preferably, the selection device is also arranged for continuously selecting a new more powerful signal from the plurality of signals received. In other words, it changes base station as soon as it detects a more powerful signal than the signal in the course of transmission. Thus, the selection device chooses and continuously transmits the most powerful signal, for ensuring an optimum service to the user.

More preferably, the wide area network interface also includes an amplifier arranged for amplifying the plurality of signals received from the broadband receiver and transmitting the plurality of amplified signals to the selection device. Thus, the selection device may easily choose the more powerful signal, including when all the signals received on the receiver have a relatively low power. In addition, the selected amplified signal is of better quality (higher rate, uninterrupted rate, etc.) for the local devices receiving it via the local area network interface or via the audio/video interface. Thus, it becomes possible to simultaneously send the same information to multiple local devices with the same quality of service. Trials have thus shown possible the display of the same video data stream simultaneously on a TV type display terminal and on a smartphone display terminal, with a very good picture and sound quality. Also, the range of the local area network interface is greater due to the better quality of the signal. Trials have shown it to be possible, for example, to print on a printer from a smartphone, both more than 400 m away from the interconnection unit, and communicating together via the local area network interface.

According to one variant, the amplifier is also arranged for attenuating the plurality of signals received from the broadband receiver if at least one of the signals received has a power higher than a maximum value, and transmitting the plurality of attenuated signals to the selection device. In other words, the amplifier may also operate as an attenuator, when the broadband receiver receives at least one signal whereof the power is higher than a maximum value, e.g. when the interconnection device according to the invention is located in the immediate proximity of a base station in a wide area network. Thus, by retransmitting an attenuated signal at the local area network interface, the wide area networks in the immediate proximity are not disturbed.

In the wide area network interface, the broadband receiver is preferably arranged for:
  reading in a removable memory, e.g. a SIM card, connection data corresponding to a subscription to a wide area network,
  transmitting the read connection data to all the base stations accessible at a given instant and in a given place for establishing a connection with said base stations, and receiving signals from each of the base stations to which the receiver is connected.

A subscription to a single wide area network is sufficient for enabling the broadband receiver to receive all the data signals transmitted by all the base stations in the mobile networks, including the base stations of other wide area networks belonging to other operators. Also, signals may be received from multiple base stations in the same network. A reception between 500 and 3000 MHz also makes it possible to receive the signals from cellular networks of any type, GSM, 3G, 3G+, 4G, etc.

The device according to the invention may also include a buffer memory, for storing a signal received from the wide area network interface and transmitting said signal to the local area network interface. Thus, the data are stored temporarily by the wide area network interface, and are progressively transmitted to the local area network interface according to the local devices connected. The received signal may be stored at a first rate, and be transmitted at a second rate which may be different from the first rate. This allows better management of the signal transmitted on the local area network, according to the demand from the local devices.

The buffer memory is preferably arranged for storing the received signal, and for transmitting the signal shifted by a predefined time to the local area network interface. This enables the interconnection device to continuously supply data to the local devices via the local area network interface, including during a possible break in the reception of data by the wide area network interface, during an automatic changeover of base station, for example.

The device according to the invention may further include an audio/video interface including:
   a VIDEO OUT terminal for enabling the connection of a local device such as a terminal via a wired connection in a VIDEO format, and
   an audio/video decoder arranged for converting a signal received from the wide area network interface into a signal in the VIDEO format and transmitting the converted signal on the VIDEO OUT terminal.

The device according to the invention thus provides a display terminal, e.g. a screen, a video projector, with an easy wired connection to a wide area network. The VIDEO format of the signal accessible on the VIDEO OUT terminal is, of course, suited to the display terminal likely to be connected. For example, an HDMI, HDTV, etc. format will be chosen for the connection of a screen, video projector, TV, etc.

Preferably, the audio/video decoder is also arranged, if all or part of the filtered signal is an audio signal, for converting an audio portion of the filtered signal into a signal in an AUDIO format and transmitting the converted signal to a radio frequency transmitter in the audio/video device. Thus, it is possible to connect speakers by radio frequency, for reproducing an audio signal received from the wide area network.

The device according to the invention may further include a control device arranged for:
   receiving user instructions via an instruction transmission device, and
   controlling the wide area network interface, the local area network interface, and if applicable the buffer memory and/or the audio/video interface, according to a received user instruction.

The control device thus controls the operation of all the components of the interconnection device according to the invention, from user instructions that it receives.

According to one embodiment, the control device includes:
   an instruction memory, for storing series of instructions for controlling the interfaces and/or the memory, a series of control instructions corresponding to a user instruction,
   a microprocessor, for executing a series of control instructions according to a received user instruction.

The instruction transmission device includes, for example:
   a keyboard and/or a mouse connected to the control device, e.g. by a Bluetooth link, and/or
   a touch screen, connected to the control device via the audio/video interface, and/or
   a personal computer, touch tablet, smartphone, telephone, etc., connected to the control device via the local area network interface and/or
   a vehicle onboard computer connected to the control device of the interconnection device, e.g. via a wired connection between the onboard computer and the audio/video interface of the interconnection device according to the invention.

More generally, the instruction transmission device may be any connectable object, connected to the control device via a Bluetooth link, via the local area network interface or via the audio/video interface, and arranged for producing at least one control instruction.

The interconnection device is particularly useful thanks to its universal aspect. It is indeed designed for the fast connection of:
   any type of communication equipment: telephone, smartphone, tablet, etc. via a Wi-Fi link,
   any type of control accessory: keyboard, mouse, etc. via a Bluetooth link,
   any type of accessory for broadcasting multimedia information: display terminal, TV, etc. via a link in a VIDEO format, sound broadcasting speaker system via a radio link, etc., paper printer, etc.

The interconnection device according to the invention makes the following possible for the various connected devices:
   the exchange of data with a cellular wide area network: Internet access via a cellular network for a telephone, smartphone, tablet, PC, etc.
   a telephone communication with a third party via a cellular network for a telephone, smartphone, etc.
   the exchange of data or instructions between two devices interconnected via the interconnection device, e.g.: image display on a display terminal or audio broadcasting on speakers connected to the interconnection device, from data stored in a memory of the control device, in a memory of a telephone, smartphone, PC, etc. connected to the interconnection device, in an external storage device (e.g. a NAS, Network Attached Storage unit) also connected to the interconnection device,
   etc.

The interconnection device according to the invention is also particularly useful for its ability to receive a signal from a telephone network, including in the areas where the network coverage is the most uncertain.

The interconnection device according to the invention is also particularly useful for its ability to stay connected and to provide a stable signal over time in the local area network, including when the interconnection device moves around, when it is used in a vehicle in motion, for example.

The device according to the invention may also allow easy connection to the wide area network of a vehicle communication system, of a system for managing the operation of an industrial facility, of a system for managing a building heating facility, etc., for remote control of the operation of said system.

The device according to the invention may also allow fast connection to the control device of the interconnection device of a connectable device arranged for producing at least one warning instruction, for example:
- a watch arranged for producing a warning signal if a physiological parameter (e.g. the pulse) of a wearer of said watch is outside an expected range of values,
- a fall detection unit arranged for producing a warning signal when a fall of a wearer of said detection unit is detected,
- a device for controlling a domestic appliance arranged for producing a warning instruction if a parameter of said appliance (e.g. the internal temperature of a cold room) is higher than a maximum permitted value,
- a vehicle onboard computer, arranged for producing a warning signal when a shock or a serious fault in the vehicle is detected.

In these last examples, in the device according to the invention, the control device stores in the instruction memory a suitable series of instructions so that, when it receives a warning signal, the control device transmits the warning signal to the wide area network interface or to the local area network interface, for transmission to a remote device such as a monitoring station, a third party's smartphone, a third party's message server, etc.

BRIEF DESCRIPTION OF THE FIGURES

The invention will be better understood, and other features and advantages of the invention will appear in light of the following description of an exemplary embodiment of an interconnection device according to the invention. These examples are given non-restrictively. The description is to be read in conjunction with the accompanying drawing in which FIG. 1 is a functional diagram of an interconnection device.

DESCRIPTION OF AN EMBODIMENT OF THE INVENTION

As said previously, the invention concerns an interconnection device, including:
- a wide area network interface 10, arranged for establishing a connection with a base station in a plurality of wide area networks of the cellular network type,
- a local area network interface 20, arranged for communication between a local device and the wide area network interface.

In the example represented, the wide area network is a cellular network, a mobile telephony network also allowing access to the mobile Internet. The local area network is in itself a Wi-Fi network, on which a plurality of local devices: telephones, smartphones, printer, etc., may be connected in a known manner. The local area network interface 20 is arranged for sharing a signal received from the wide area network interface between all the local devices. The interface 20 is also arranged for enabling local devices to exchange data and/or instructions between them or to exchange data and/or instructions with a remote device accessible on the wide area network.

The wide area network interface 10 includes a broadband receiver 11 arranged for continuously receiving a plurality of communication signals from a plurality of base stations associated with the plurality of wide area networks; the receiver 11 receives all signals having transmission frequencies between 500 and 3000 MHz.

An area is provided in the interface 10 for placing a memory card, of the SIM data card type, storing connection data corresponding to a subscription to a wide area network. The broadband receiver is arranged for:
- reading connection data in the memory card,
- transmitting the read connection data to all the base stations accessible at a given instant and in a given place for establishing a connection with said base stations,
- receiving signals from each of the base stations to which the receiver is connected.

The interface 10 also includes a selection device 12 arranged for selecting a more powerful signal from the plurality of signals received, and transmitting the selected signal. The selection device 12 is also arranged for continuously selecting a new more powerful signal from the plurality of signals received, and transmitting the selected signal.

The wide area network interface 10 also includes an amplifier 13 arranged for amplifying the plurality of signals received from the broadband receiver 11 and transmitting the plurality of amplified signals to the selection device. The amplifier is reversible, i.e. it is also arranged for attenuating the plurality of signals received from the broadband receiver if at least one of the received signals has a power higher than a maximum value, and transmitting the plurality of attenuated signals to the selection device. This is to avoid disturbing wide area networks in the immediate proximity.

The broadband receiver receives the signals from all the mobile data networks accessible at the place where it is located. The selection device then selects the best network available at a given instant and at the given point. The selection device continuously monitors the signals received from the broadband receiver, and changes network as soon as a more powerful signal is detected on another network. Located between the broadband receiver 11 and the selection device 12, the amplifier amplifies all the signals, which facilitates the activity of the selection device, notably when all the received signals are quite weak. In addition, with an amplified signal, the devices local to the interconnection device are assured of receiving the best possible signal.

The device according to the invention also includes a buffer memory 30 for the temporary storage of data from the wide area network. The memory is arranged for storing a signal received from the wide area network interface at a first rate and transmitting said signal to the local area network interface at a second rate. The buffer memory is arranged for transmitting the received signal to the local area network interface shifted in time, with a predefined delay of the order of 15 to 60 seconds. Thus, while the wide area network interface changes base station because it has detected a more powerful signal, the local area network interface continues to receive data from the buffer memory, without an interruption in signal. Thus, any change in signal is totally invisible to the local devices connected to the audio/video interface (see below) or to the local area network interface.

The interconnection device according to the invention also includes an audio/video interface 40 including:

a VIDEO OUT terminal 41 for enabling the connection of a local device such as a display terminal via a wired connection in the VIDEO format, an audio/video decoder 43 arranged for converting a signal received from the wide area network interface into a signal in the VIDEO format and transmitting the converted signal on the VIDEO OUT terminal.

In the example represented, the audio/video decoder is also arranged, if all or part of the received signal is an audio signal, for converting an audio portion of the received signal into a signal in an AUDIO format and transmitting the converted signal to a radio frequency transmitter 45 in the audio/video interface.

In the example represented, the display terminal is a TV 42; other types of display terminals may be envisaged: screen for computer, video projector, etc.

The interconnection device also includes a control device 50 arranged for:

receiving user instructions via an instruction transmission device, and controlling the wide area network interface 10, the local area network interface 20, the buffer memory 30 and the audio/video interface 40, according to a received user instruction.

The control device 50 includes:

an instruction memory 51, for storing series of instructions for controlling the interfaces 10, 20, 40 and the memory 30; a series of control instructions corresponds to a user instruction, a microprocessor 52, for executing a series of control instructions according to a received user instruction.

The instruction transmission device in the example represented includes a keyboard 61 and a mouse 62 connected to the control device by a Bluetooth link. More generally, all the terminals connected to the interconnection device (display terminal 42, mobile phone, computer 63, smartphone 64, etc.) connected to the control device via the local area network interface 20, the audio/video interface 40, or a Bluetooth link, may transmit instructions to the control device.

According to the use that is made of the interconnection device, the instruction transmission device may include:

a touch screen, connected to the control device via the audio/video interface, a personal computer, touch tablet, smartphone, telephone, etc., connected to the control device via the local area network interface, a vehicle onboard computer connected to the control device of the interconnection device, e.g. via a wired connection between the onboard computer and the audio/video interface of the interconnection device according to the invention.

The device according to the invention is preferably equipped with an accumulator for powering all the devices that it includes. It is thus completely autonomous, it does not need to be connected to a power distribution network and may therefore be used while traveling.

In FIG. 1, the thick line arrows depict the routing of downstream data between the wide area network interface and the various local devices. The thin line arrows depict the transmission of instructions between both the control device and the various components of the device according to the invention, and the local devices that are connected to it.

A prototype of an interconnection device has been produced, all in a unit the size of a smartphone for a weight of approximately 120 to 200 grams. It may thus be easily transported in a coat pocket or a purse, or be slipped in a glove compartment of a vehicle.

The prototype produced was successfully tested in the most remote geographical areas where it is impossible to make a telephone call with a smartphone or a telephone on a mobile telephone network. Also, trials made in a place where there is a good 3G signal showed that the same smartphone in optimum conditions received up to ten times more signal by connecting via the interconnection device according to the invention than by connecting directly onto the network of the operator to which the user is subscribed. Also, trials were made in trains and automobiles in motion, and made it possible to obtain a very good quality data rate on a smartphone, without an interruption in signal, with a fluid and constant rate enabling a video stream to be watched in very good conditions.

The device according to the invention may be used in a building (private house, corporation, etc.), for creating a local area network and connecting thereto all the connectable devices in or around the building (multimedia equipment, heating and/or air conditioning system, shutters, domestic appliances, etc.), connecting them together and connecting them to the Internet.

The device according to the invention may also be carried by a user, for having a perfect Internet connection for all his/her multimedia equipment at any time. It may also be installed in a vehicle.

The invention claimed is:

1. An apparatus comprising an interconnection device, wherein said interconnection device comprises a wide-area-network interface, and a local-area-network interface, wherein said wide-area-network interface comprises an amplifier, a broadband receiver, and a selection device, wherein said wide-area-network interface is configured for establishing a connection with a base station in a plurality of wide-area cellular networks, wherein said local-area-network interface is configured for communication between a local device and said wide-area-network interface, wherein said broadband receiver is configured for continuously receiving a plurality of communication signals from a plurality of base stations associated with said plurality of wide-area networks, wherein said base stations have transmission frequencies between 500 MHz and 3,000 MHz, wherein said selection device is arranged for selecting a more powerful signal from said plurality of signals received and transmitting said selected signal, and wherein said amplifier is configured for amplifying the plurality of signals received from the broadband receiver and transmitting the plurality of amplified signals to the selection device, said apparatus further comprising a buffer memory for storing a signal received from said wide-area-network interface and for transmitting said signal to said local-area-network interface, wherein said local-area-network interface is configured to provide said stored signal to a local device, wherein said stored signal was provided by a first base station, wherein said selection device has selected a second base station, and wherein, at the time said stored signal is provided to said local device, said first base station has a less powerful signal than said second base station.

2. The apparatus of claim 1, wherein said buffer memory is arranged for storing said signal received from said wide-area-network interface and transmitting said signal, shifted by a predefined time, to the local-area-network interface.

3. The apparatus of claim 1, further comprising an audio/video interface, wherein said audio/video interface comprises a VIDEO OUT terminal and an audio/video decoder, wherein said VIDEO OUT terminal is configured for enabling connection of a local device via a wired connection in a VIDEO format and wherein said audio/video decoder is arranged for converting a signal received from said wide-area network interface into a signal in said VIDEO format and transmitting said converted signal on the VIDEO OUT terminal.

4. The apparatus of claim 3, wherein said audio/video decoder is configured for converting an audio portion of the received signal into a signal in an AUDIO format and transmitting the converted signal to a radio frequency transmitter in the audio/video interface when at least part of said received signal is an audio signal.

5. The apparatus of claim 1, further comprising a control device configured for receiving user instructions via an instruction transmission device, and controlling an interface according to received user information, wherein said interface is selected from the group consisting of the wide-area network interface, the local-area-network interface, the buffer memory and the audio/video interface.

6. The apparatus of claim 5, wherein said control device comprises an instruction memory and a microprocessor, wherein said instruction memory stores instructions for controlling the interfaces and/or the memory and control instructions corresponding to a user instruction and wherein said microprocessor is configured for executing a series of control instructions according to a received user instruction.

7. The apparatus of claim 5, wherein said instruction transmission device comprises a structure selected from the group consisting a structure from a first set, a structure from a second set, and a structure from a third set, wherein said first set consists of a keyboard connected to the control device and a mouse connected to the control device wherein said second set consists of a personal computer, a touch tablet, a smartphone, and a telephone, any of which are connected to said control device via said local-area-network interface, and wherein said third set consists of a vehicle onboard computer connected to the control device of the interconnection device via a wired connection between the onboard computer and the audio/video interface of the interconnection device.

8. The apparatus of claim 1, wherein local-area network is a wireless network.

9. The apparatus of claim 5, wherein said instruction transmission device comprises a touch screen connected to the control device via the audio/video interface.

10. The apparatus of claim 5, wherein said instruction transmission device includes a structure selected from the group consisting of a personal computer, a touch tablet, smartphone, and a telephone connected to the control device via the local-area-network interface.

11. The apparatus of claim 5, wherein said instruction transmission device comprises a vehicle onboard-computer connected to the control device of the interconnection device via a connection between the onboard computer and the audio/video interface of the interconnection device.

12. The apparatus of claim 1, wherein said amplifier is disposed between said receiver and said selection device.

13. The apparatus of claim 1, wherein said amplifier is a reversible amplifier.

14. The apparatus of claim 1, wherein said local-area-network interface shares a signal received from said wide-area-network interface between multiple local devices.

15. The apparatus of claim 1, wherein said selection device continuously selects a new more powerful signal from the plurality of signals received and transmits said selected signal.

16. The apparatus of claim 1, wherein the amplifier is arranged for attenuating the plurality of signals received from the broadband receiver if at least one of the signals received has a power higher than a maximum value and transmitting the plurality of attenuated signals to the selection device.

17. The apparatus of claim 1, wherein said broadband receiver is configured to read connection data from a removable memory, to transmit said connection data to all accessible base stations, to establish connections with said base stations, and to receive signals from each of said base stations to which said broadband receiver is connected, wherein said connection data corresponds to a subscription to a wide-area network.

18. The apparatus of claim 17, wherein said removable memory includes a SIM card.

* * * * *